United States Patent
Matsuhashi et al.

(10) Patent No.: US 7,714,223 B2
(45) Date of Patent: May 11, 2010

(54) REPRODUCTION DEVICE, REPRODUCTION METHOD AND COMPUTER USABLE MEDIUM HAVING COMPUTER READABLE REPRODUCTION PROGRAM EMODIED THEREIN

(75) Inventors: Taiyo Matsuhashi, Yokohama (JP); Haruyoshi Kumasaka, Yokohama (JP); Yoshihiro Sagawa, Yokohama (JP); Hiromasa Ishiyama, Yokohama (JP); Takeshi Kogure, Yokohama (JP)

(73) Assignee: Victor Company of Japan, Limited, Yokohama-Shi (JP)

( * ) Notice: Subject to any disclaimer, the term of this patent is extended or adjusted under 35 U.S.C. 154(b) by 110 days.

(21) Appl. No.: 12/010,685

(22) Filed: Jan. 29, 2008

(65) Prior Publication Data

US 2008/0289479 A1    Nov. 27, 2008

(30) Foreign Application Priority Data

Jan. 30, 2007 (JP) ............................. 2007-019419
Dec. 27, 2007 (JP) ............................. 2007-337815

(51) Int. Cl.
*A63H 5/00* (2006.01)
*G04B 13/00* (2006.01)

(52) U.S. Cl. ........................... 84/610; 84/609; 84/634; 84/649; 84/650; 84/666

(58) Field of Classification Search ........................ None
See application file for complete search history.

(56) References Cited

U.S. PATENT DOCUMENTS 4,376,874 A    3/1983   Karban et al.

FOREIGN PATENT DOCUMENTS

| JP | 2004-093729 A | 3/2004 |
| WO | WO 98/41978 | 9/1998 |
| WO | WO 03/043007 A2 | 5/2003 |

OTHER PUBLICATIONS

XP002501925. Eisenlohr, P. "Xmms-crossfade: XMMS Plugin for Crossfading / Continous Output—readme" Internet Article, [Online]. Oct. 10, 2006.
XP000950031. Patel, et al. "Audio Characterization for Video Indexing" Proceedings of the Spie—The International Society for Optical Engineering, Spie, Bellingham, VA.

*Primary Examiner*—Marlon T Fletcher
(74) *Attorney, Agent, or Firm*—The Nath Law Group; Jerald L. Meyer; Derek Richmond

(57) ABSTRACT

The reproduction device comprises a decoding section, a threshold calculating section, and a musical data output section. The threshold calculating section calculates an average amplitude level in a predetermined section of an end portion of first musical data generated by the decoding section, and calculates a threshold for detecting a silent portion of the end portion of the first musical data on the basis of the calculated average amplitude level. The musical data output section removes a silent portion between the first musical data and the second musical data and reproduces them so that a position nearest to the end position of the first musical data at an amplitude level which is the threshold or more is a reproduction ending position and so that a position near the leading position of the second musical data at an amplitude level which is the threshold or more is a reproduction starting position.

18 Claims, 15 Drawing Sheets

REPRODUCTION DEVICE, REPRODUCTION METHOD AND COMPUTER USABLE MEDIUM HAVING COMPUTER READABLE REPRODUCTION PROGRAM EMODIED THEREIN

BACKGROUND OF THE INVENTION

1. Field of the Invention

The present invention relates to a reproduction device, a reproduction method and a computer usable medium having a computer readable reproduction program embodied therein for decoding compressed musical data and reproducing the decoded musical data while suppressing the occurrence of a gap causing sound interruption between pieces of music.

2. Description of the Related Art

Various musical data compression technologies such as MP3 (MPEG-1 Audio Layer III) and AAC (Advanced Audio Coding) have been standardized due to the spread of portable digital audio players (DAP).

In such compression technologies, data of a piece of music is managed as one music source, and one music source is divided into frames and compressed (encoded). In an encoding process of obtaining compressed musical data from a music source, a modified discrete cosine transform (MDCT) is used. An MDCT transform is performed making adjacent frames overlap each other, thereby having the advantage of preventing the occurrence of a noise on the boundary between the adjacent frames.

On the other hand, since an MDCT transform makes adjacent frames overlap each other, it needs, when expanding (decoding) data of a frame, data of a frame just before the frame to be expanded. Therefore, in encoding using an MDCT transform, a leading frame to which a silent portion is added is produced before the leading position of musical data. Likewise, an end frame to which a silent portion is added is produced after the end position of the musical data.

FIG. 1 shows an example of a waveform of the leading portion of a music source before encoding, and an example of a waveform of the leading portion of compressed musical data after encoding. As shown in FIG. 1, the compressed musical data after encoding is divided into frames, and a silent portion is added to the leading portion. The compressed musical data after encoding in FIG. 1 causes a delay of sound emission as compared with the musical data before encoding due to addition of a silent portion to the leading portion. FIG. 2 shows an example of a waveform of the end portion of a music source before encoding, and an example of a waveform of the end portion of compressed musical data after encoding. As shown in FIG. 2, a silent portion is added also to the end portion of the compressed musical data after encoding.

By the way, music compact discs (CDs) include so-called live disks on which a live performance music constituted by pieces of music connected with each other is recorded. When encoding is performed every music source of a piece of music obtained by playing back a live disk by a compression technology using the MDCT transform described above to produce compressed musical data, and then the compressed musical data is decoded to be reproduced, a gap occurs between the end portion of a piece of music and the leading portion of the next piece of music. By the occurrence of this gap, the sound is interrupted momentarily and an unnatural sound is reproduced.

The following techniques of eliminating such a gap between pieces of music are known.

(1) When music is switched from a piece of music to the next piece of music, cross-fade that fades out the sound of the end portion of a reproduced piece of music and simultaneously fades in the sound of the leading portion of a piece of music reproduced next (the next reproduced piece of music) is performed for several seconds, thus reproducing the pieces of music in such a manner, a gap between the pieces of music is inconspicuous. FIG. 3 shows an example of a waveform in which a reproduced piece of music indicated with a broken line and the next reproduced piece of music indicated with a solid line are cross faded.

(2) Information about the length of a music source is stored when encoding the music source, and gaps between pieces of music are eliminated based on the information, thereby reproducing the pieces of music without the occurrence of gaps between the pieces of music.

(3) Music sources of a plurality of pieces of music having no silent portion between pieces of music such as music sources of a live disk are stored in one file, thereby reproducing the pieces of music without the occurrence of gaps between the pieces of music. This technique is disclosed in Japanese Patent Application Laid-Open No. 2004-93729.

However, in the case of technique (1), pieces of music are not connected continuously as shown in FIG. 3, so that reproduced sound is unnatural. In the case of technique (2), a player reproducing pieces of music while eliminating gaps between pieces of music is limited to one corresponding to a device (encoder) which performs the encoding. In other words, the player is required to previously know what kind of encoding was performed. In the case of technique (3), the player is limited to one corresponding to the encoder as in the case of technique (2). Furthermore, the whole of music sources of two or more pieces of music is stored in one file, so that it is difficult to reproduce a desired piece of music immediately.

SUMMARY OF THE INVENTION

The present invention has been developed from the above point of view and aims to provide a reproduction device, a reproduction method and a computer usable medium having a computer readable reproduction program embodied therein which are able to reproduce pieces of music while suppressing the occurrence of gaps causing sound interruption between the pieces of music, regardless of a compression technology, when reproducing compressed musical data which has been encoded every music source of a piece of music obtained from a live disk.

In order to achieve the above object, the present invention provides a reproduction device (2) comprising: a decoding unit (23, 24) configured to sequentially decode compressed musical data to be reproduced; a threshold calculating unit (24, 26, 27) configured to calculate an average amplitude level in a predetermined section of an end portion of first musical data generated by decoding first compressed musical data by the decoding unit, and calculate a threshold for detecting a silent portion in the end portion of the first musical data on the basis of the calculated average amplitude level; a reproduction ending position detector (24, 26) detecting a position of the first musical data as a reproduction ending position used at a time of reproduction of the first musical data, wherein the position is nearest to an end position of the first musical data at an amplitude level which is the threshold calculated by the threshold calculating unit or more; a reproduction starting position detector (24, 26) detecting a position of second musical data, which is generated by decoding second compressed musical data to be reproduced next to the first compressed musical data by the decoding unit, as a reproduction starting position used at a time of reproduction of the second musical data, wherein the position is near a leading position of the second musical data at an amplitude level which is the threshold or more; and a reproducing unit (24, 26, 30) configured to reproduce the first musical data until the reproduction ending position and then reproduce the second musical data from the reproduction starting position.

In a preferred embodiment of the present invention, the reproduction starting position detector detects a position in a data portion of the second musical data as the reproduction starting position of the second musical data, the data portion has the same amplitude fluctuation direction as an amplitude fluctuation direction at the reproduction ending position of the first musical data, and the position is nearest to the leading position of the second musical data at an amplitude level which is within a range of a predetermined level from the amplitude level at the reproduction ending position of the first musical data.

In a preferred embodiment of the present invention, the reproduction starting position detector detects a position of the second musical data as the reproduction starting position of the second musical data, and the position is nearest to the leading position of the second musical data and has a waveform inclination which is within a range of a predetermined inclination from a waveform inclination at the reproduction ending position of the first musical data.

In a preferred embodiment of the present invention, the reproduction device further comprises a determining unit (24) configured to determine whether or not the threshold is a predetermined value or less, wherein the reproduction ending position detector detects the end position of the first musical data as the reproduction ending position used at a time of reproduction of the first musical data when the determining unit determines that the threshold is the predetermined value or less, and the reproduction starting position detector detects the leading position of the second musical data as the reproduction starting position used at a time of reproduction of the second musical data when the determining unit determines that the threshold is the predetermined value or less.

In a preferred embodiment of the present invention, the reproduction device further comprises a waveform shaping unit (24, 26, 28) configured to shape a waveform in a predetermined section before the reproduction ending position of the first musical data and a waveform in a predetermined section after the reproduction starting position of the second musical data so as to connect the reproduction ending position of the first musical data to the reproduction starting position of the second musical data continuously.

In a preferred embodiment of the present invention, the waveform shaping unit shapes waveforms so that an amplitude level at a position where the first musical data is connected to the second musical data is a level representing silence.

In order to achieve the above object, the present invention provides a reproduction method comprising the steps of: sequentially decoding compressed musical data to be reproduced; calculating an average amplitude level in a predetermined section of an end portion of first musical data generated by decoding first compressed musical data by the decoding step, and calculating a threshold for detecting a silent portion in the end portion of the first musical data on the basis of the calculated average amplitude level; detecting a position of the first musical data as a reproduction ending position used at a time of reproduction of the first musical data, wherein the position is nearest to an end position of the first musical data at an amplitude level which is the threshold calculated by the threshold calculating step or more; detecting a position of second musical data, which is generated by decoding second compressed musical data to be reproduced next to the first compressed musical data by the decoding step as a reproduction starting position used at the time of reproduction of the second musical data, wherein the position is near a leading position of the second musical data at an amplitude level which is the threshold or more; and reproducing the first musical data until the reproduction ending position and then reproducing the second musical data from the reproduction starting position.

In a preferred embodiment of the present invention, the starting position detecting step detects a position in a data portion of the second musical data as the reproduction starting position of the second musical data, the data portion has the same amplitude fluctuation direction as an amplitude fluctuation direction at the reproduction ending position of the first musical data, and the position is nearest to the leading position of the second musical data at an amplitude level which is within a range of a predetermined level from the amplitude level at the reproduction ending position of the first musical data.

In a preferred embodiment of the present invention, the starting position detecting step detects a position of the second musical data as the reproduction starting position of the second musical data, and the position is nearest to the leading position of the second musical data and has a waveform inclination which is within a range of a predetermined inclination from a waveform inclination at the reproduction ending position of the first musical data.

In a preferred embodiment of the present invention, the reproduction method further comprises a step of determining whether or not the threshold is a predetermined value or less, wherein the ending position detecting step detects the end position of the first musical data as the reproduction ending position used at a time of reproduction of the first musical data when the determining step determines that the threshold is the predetermined value or less, and the starting position detecting step detects the leading position of the second musical data as the reproduction starting position used at a time of reproduction of the second musical data when the determining unit determines that the threshold is the predetermined value or less.

In a preferred embodiment of the present invention, the reproduction method further comprises a step of shaping a waveform in a predetermined section before the reproduction ending position of the first musical data and a waveform in a predetermined section after the reproduction starting position of the second musical data so as to connect the reproduction ending position of the first musical data to the reproduction starting position of the second musical data continuously.

In a preferred embodiment of the present invention, the waveform shaping step shapes waveforms so that an amplitude level at a position where the first musical data is connected to the second musical data is a level representing silence.

In order to achieve the above object, the present invention provides a computer usable medium having a computer readable reproduction program embodied therein, the computer readable reproduction program comprising: a first reproduction program code causing the computer to sequentially decode compressed musical data to be reproduced; a second reproduction program code causing the computer to calculate an average amplitude level in a predetermined section of an end portion of first musical data generated by decoding first compressed musical data by the first reproduction program code, and calculate a threshold for detecting a silent portion in the end portion of the first musical data on the basis of the calculated average amplitude level; a third reproduction program code causing the computer to detect a position of the first musical data as a reproduction ending position used at a time of reproduction of the first musical data, wherein the position is nearest to an end position of the first musical data at an amplitude level which is the threshold calculated by the second reproduction program code or more; a fourth reproduction program code causing the computer to detect a position of second musical data, which is generated by decoding second compressed musical data to be reproduced next to the first compressed musical data by the first reproduction program code, as a reproduction starting position used at a time of reproduction of the second musical data, wherein the position is near a leading position of the second musical data at an amplitude level which is the threshold or more; and a fifth reproduction program code causing the computer to reproduce the first musical data until the reproduction ending position and then reproduce the second musical data from the reproduction starting position.

In a preferred embodiment of the present invention, the fourth reproduction program code causes the computer to detect a position in a data portion of the second musical data as the reproduction starting position of the second musical data, the data portion has the same amplitude fluctuation direction as an amplitude fluctuation direction at the reproduction ending position of the first musical data, and the position is nearest to the leading position of the second musical data at an amplitude level which is within a range of a predetermined level from the amplitude level at the reproduction ending position of the first musical data.

In a preferred embodiment of the present invention, the fourth reproduction program code causes the computer to detect a position of the second musical data as the reproduction starting position of the second musical data, and the position is nearest to the leading position of the second musical data and has a waveform inclination which is within a range of a predetermined inclination from a waveform inclination at the reproduction ending position of the first musical data.

In a preferred embodiment of the present invention, the medium further comprises a sixth reproduction program code causing the computer to determine whether or not the threshold is a predetermined value or less, wherein the third reproduction program code causes the computer to detect the end position of the first musical data as the reproduction ending position used at a time of reproduction of the first musical data when the sixth reproduction program code causes the computer to determine that the threshold is the predetermined value or less, and the fourth reproduction program code causes the computer to detect the leading position of the second musical data as the reproduction starting position used at a time of reproduction of the second musical data when the sixth reproduction program code causes the computer to determine that the threshold is the predetermined value or less.

In a preferred embodiment of the present invention, the medium further comprises a seventh reproduction program code causing the computer to shape a waveform in a predetermined section before the reproduction ending position of the first musical data and a waveform in a predetermined section after the reproduction starting position of the second musical data so as to connect the reproduction ending position of the first musical data to the reproduction starting position of the second musical data continuously.

In a preferred embodiment of the present invention, the seventh reproduction program code causes the computer to shape waveforms so that an amplitude level at a position where the first musical data is connected to the second musical data is a level representing silence.

According to the present invention, when compressed musical data obtained by playing back a live click is decoded and reproduced, even if it is any kind of musical data, the occurrence of gaps causing sound interruption between pieces of music can be suppressed.

DESCRIPTION OF THE PREFERRED EMBODIMENT

An embodiment of the present invention will be described in detail below with reference to FIGS. 4 to 16.

Figure 1:
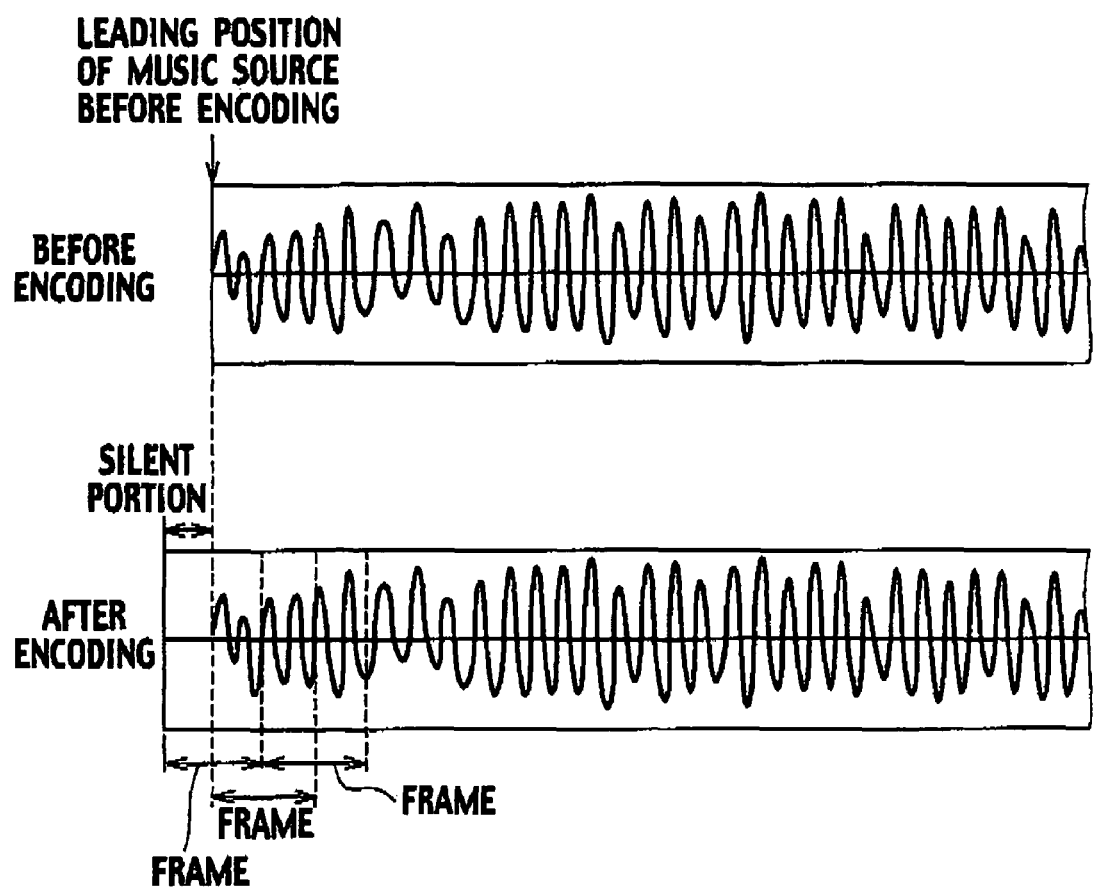
FIG. 1 shows an example of a waveform of the leading portion of a music source before encoding, and an example of a waveform of the leading portion of the music source after encoding, in a prior art.
Figure 2:
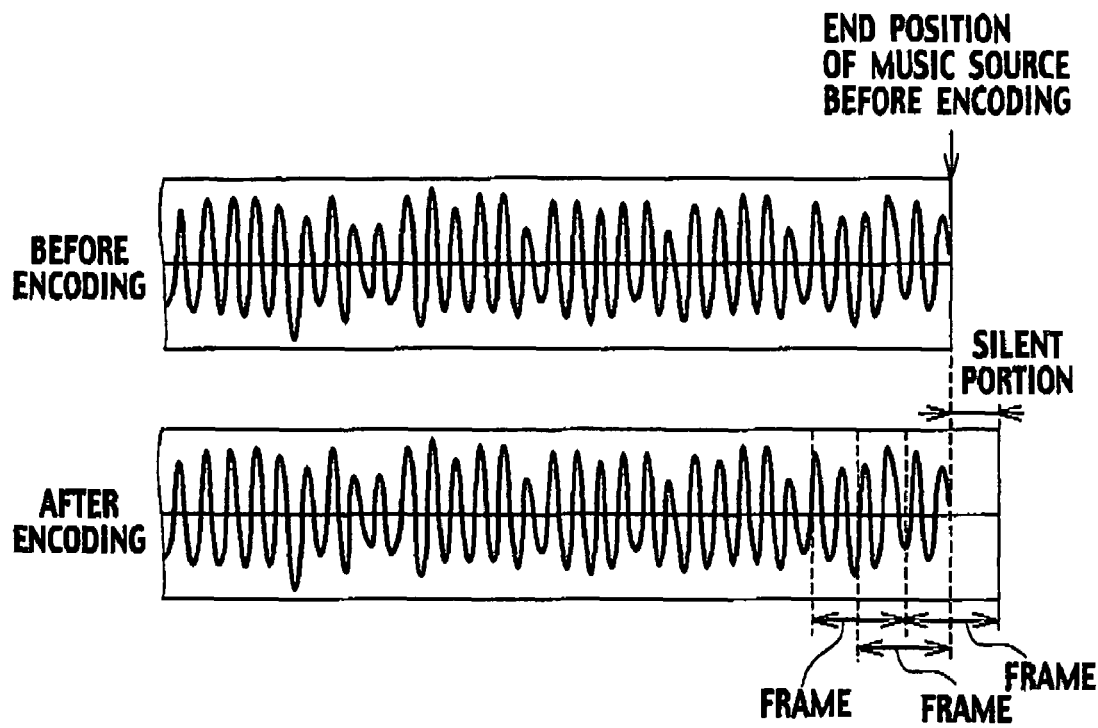
FIG. 2 shows an example of a waveform of the end portion of a music source before encoding, and an example of a waveform of the end portion of the music source after encoding, in a prior art.
Figure 3:
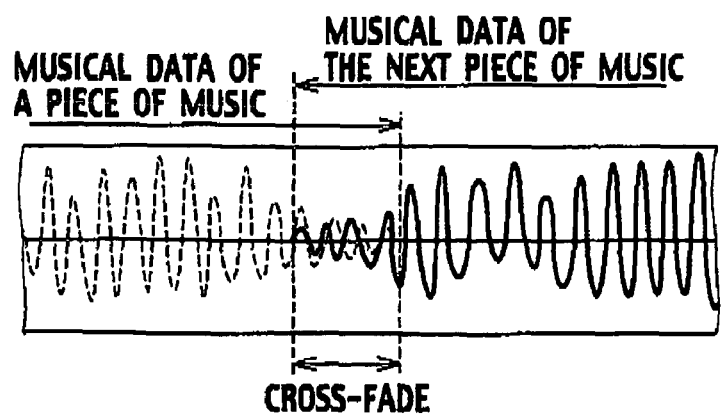
FIG. 3 shows an example of a waveform in which a reproduced piece of music and the next reproduced piece of music are cross faded, in a prior art.
Figure 4:
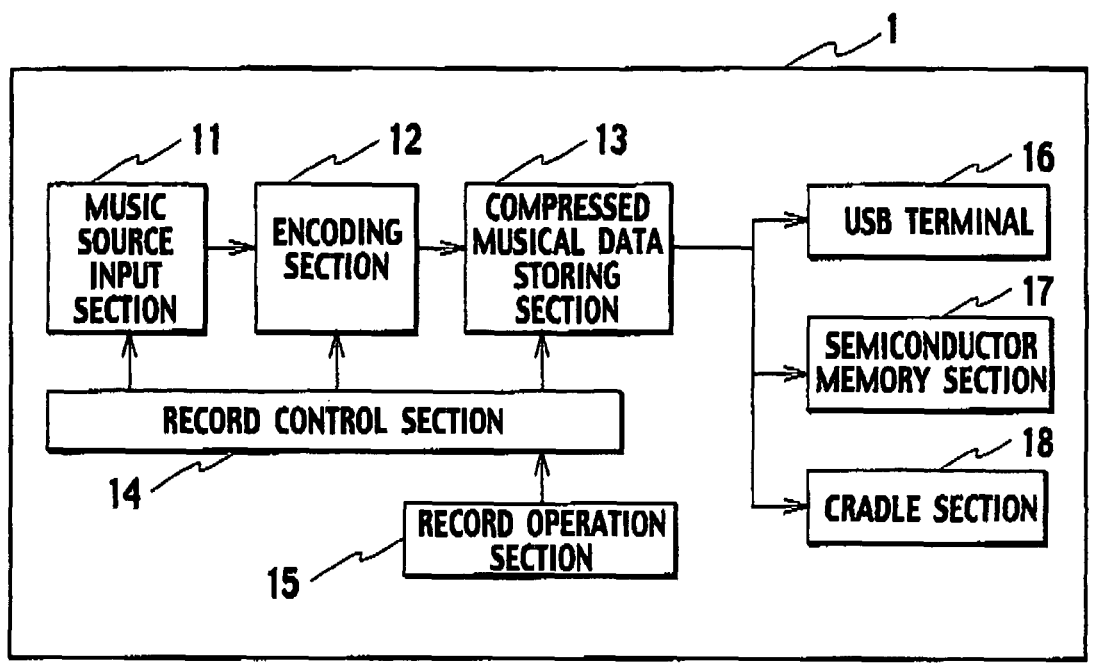
FIG. 4 is a block diagram of a recording device according to an embodiment of the present invention.

First, a recording device according to the embodiment of the present invention will be described with reference to FIGS. 4 to 7. FIG. 4 is a block diagram showing an example of the configuration of the recording device. As shown in FIG. 4, the recording device 1 comprises a music source input section 11, an encoding section 12, a compressed musical data storing section 13, a record control section 14, a record operation section 15, a USB terminal 16, a semiconductor memory section 17, and a cradle section 18.

To the music source input section 11, music sources recorded in a recording medium such as a CD, a server, or the like are input from the medium, the server, or the like. The music source input section 11 then supplies the music sources every music source corresponding to a piece of music on the basis of the control of the record control section 14. The encoding section 12 encodes the music sources by a compression technology using an MDCT transform described above and supplies compressed musical data encoded to the compressed musical data storing section 13 by the control of the record control section 14.

When a medium to which the compressed musical data is output has been selected by a user's selection operation, the record operation section 15 supplies a selection indicating signal to the compressed musical data storing section 13 through the record control section 14. The compressed musical data storing section 13 records and stores the compressed musical data supplied from the encoding section 12, and supplies the compressed musical data to the USB terminal 16, the semiconductor memory section 17, or the cradle section 18 on the basis of the selection indicating signal. The USB terminal 16 is a terminal for supplying compressed musical data to a reproduction device described later through a USB cable connected to the USB terminal 16. The semiconductor memory section 17 is a section for supplying compressed musical data to a removable semiconductor memory. The cradle section 18 is stand type connection equipment which needs no connection cable, and is a section for supplying compressed musical data to a reproduction device. The cradle section 18 is able to transmit data to and receive data from a reproduction device connected to the cradle section 18, and is also able to charge the reproduction device.

Figure 5:
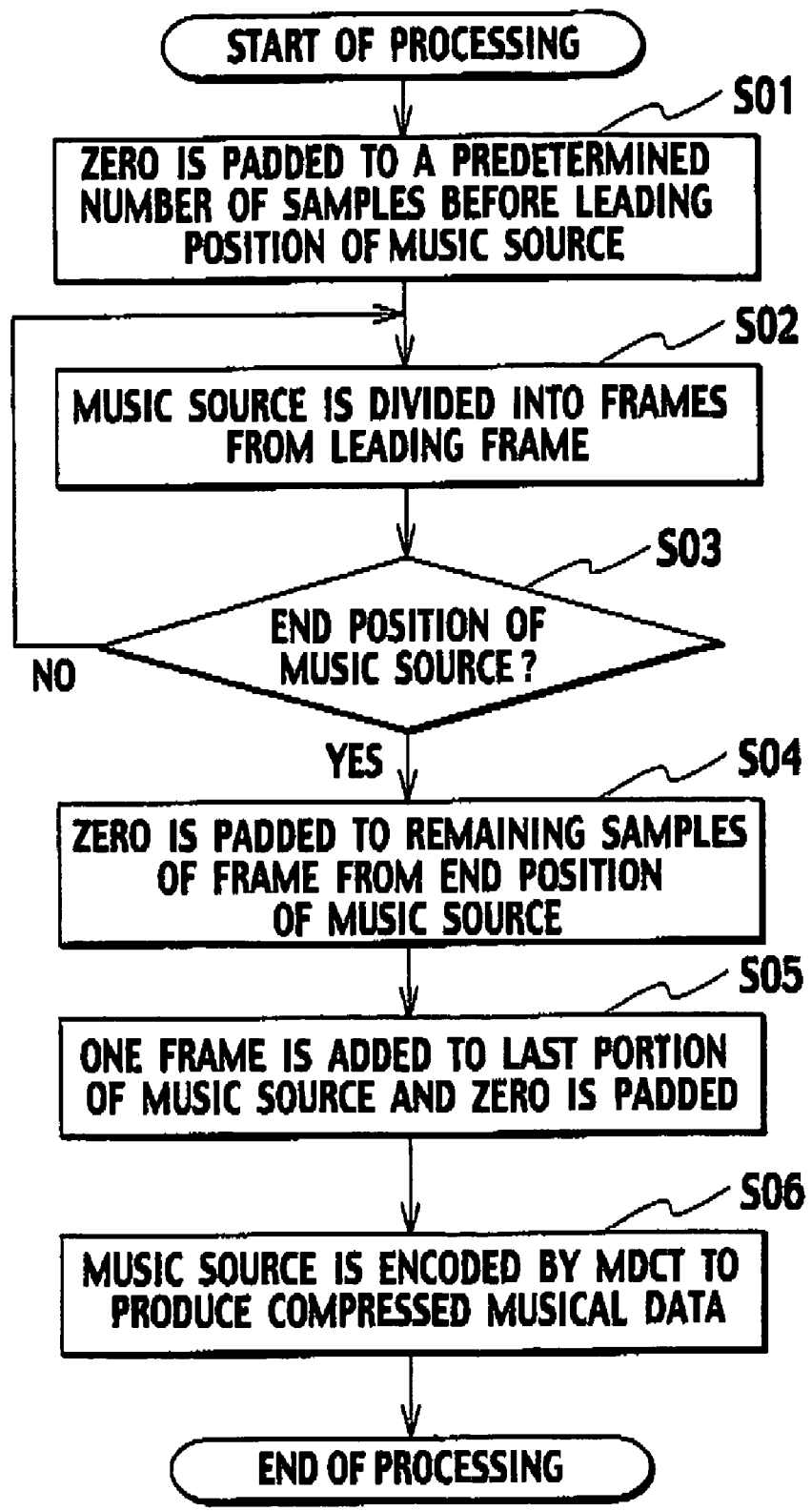
FIG. 5 is a flow chart of encoding performed by the recording device according to the embodiment of the present invention.
Figure 6:
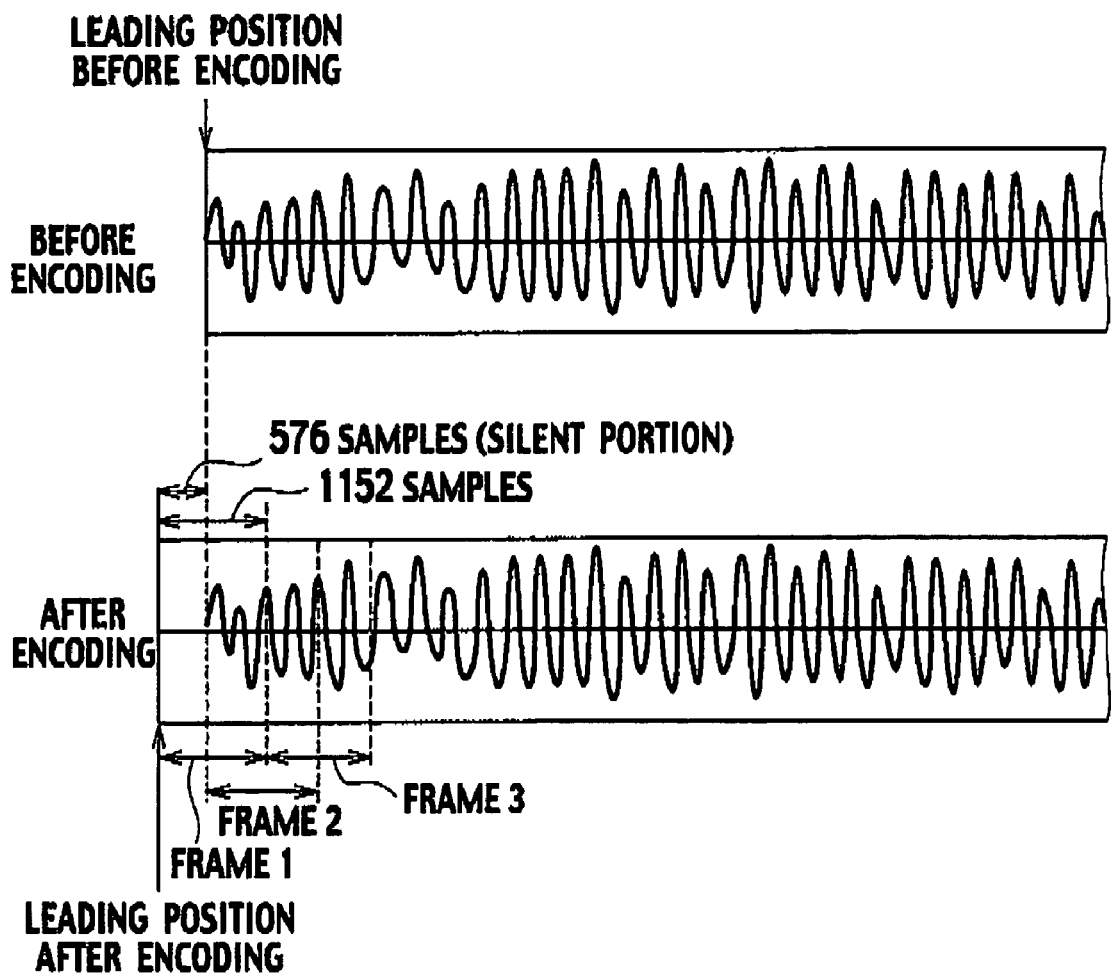
FIG. 6 is a diagram showing an example of a waveform of the leading portion of compressed musical data before encoding performed by the recording device according to the embodiment of the present invention, and an example of a waveform of the leading portion of the compressed musical data after the encoding.
Figure 7:
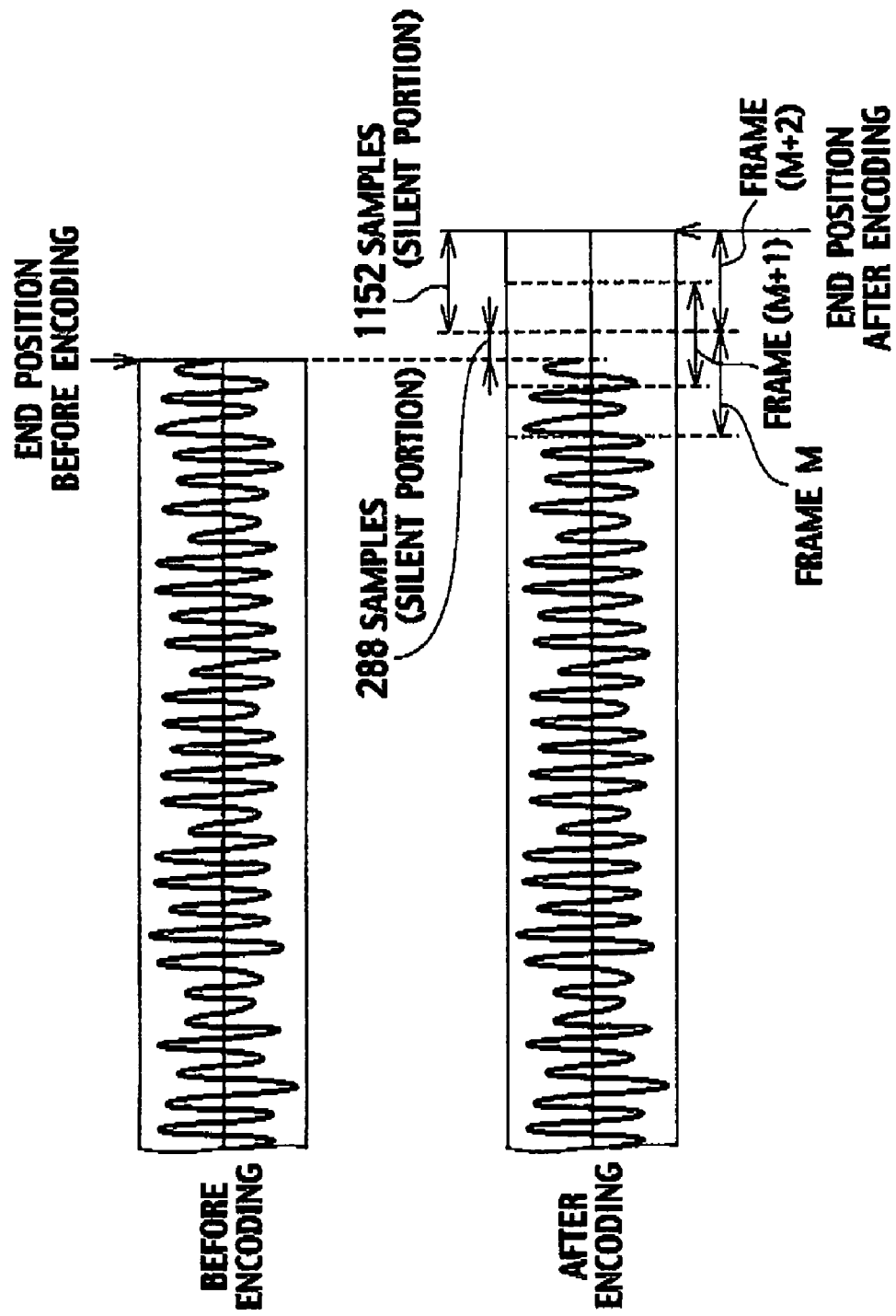
FIG. 7 is a diagram showing an example of a waveform of the end portion of compressed musical data before encoding performed by the recording device according to the embodiment of the present invention, and an example of a waveform of the end portion of the compressed musical data after the encoding.

FIG. 5 is a flow chart showing an example of a procedure of encoding in the recording device shown in FIG. 4, FIG. 6 shows an example of a waveform of the leading portion of a music source before encoding performed by the recording device shown in FIG. 4, and an example of a waveform of the leading portion of the music source after the encoding. FIG. 7 shows an example of a waveform of the end portion of a music source before encoding performed by the recording device shown in FIG. 4, and an example of a waveform of the end portion of the music source after the encoding.

The encoding section 12 and the record control section 14 encode musical data supplied from the music source input section 11 according to the following procedure. First, the record control section 14 controls the encoding section 12 so as to add a silent portion to a predetermined number of samples before the leading position of a music source as shown in FIG. 6 (step S01 of FIG. 5). Addition of a silent portion is performed by the way of padding invalid data (zero) to a predetermined number of samples in a data region. This silent portion is generally referred to as an encoder delay.

For example, as shown in FIG. 6, one of frames into which a music source is divided to be managed includes 1152 samples. Furthermore, in the case of data supplied from a CD, 44100 samples correspond to data for one second. The record control section 14 controls the encoding section 12 so as to pad zero to 576 samples of a half frame. Thus, in the leading frame 1 after encoding, a silent portion which is half of one frame is formed from the leading position. The record control section 14 then controls the encoding section 12 so as to divide the musical source into frames 1, 2, 3, ... in succession while making 576 samples of half of one frame overlap 576 samples of half of the next one frame (step S02 of FIG. 5).

The record control section 14 determines whether or not the end position of the music source exists in a frame obtained by division at step S02 (step S03 of FIG. 5). When the end position of the music source is not detected, the procedure returns to step S02 where the music data is divided into frames. When the end position of the musical data is detected, the record control section 14 controls the encoding section 12 so as to pad zero to the remaining samples of less than one frame from the end position of the music source (step S04 of FIG. 5). In addition, the record control section 14 controls the encoding section 12 so as to add one frame to the last portion of the music source and pad zero to the samples of the one frame (step S05 of FIG. 5).

As shown in FIG. 7, the music source becomes waveform data to which silent portions are added, after being encoded at steps S04 and S05. For example, a case that the end position of the musical data is detected in a frame (M) (M is an integer of 1 or more) shown in FIG. 7 will be described. When the number of samples including effective data of the frame (M) is 864, the record control section 14 controls the encoding section 12, at step S04, so as to pad zero to the remaining 288 samples of one frame. In addition, the record control section 14 controls, at step S05, the encoding section 12 so as to pad zero to 1152 samples of one frame. Thus, the next frame (M+1) has 288 samples including effective data and 864 samples including invalid data. Furthermore, the last frame (M+2) includes only invalid data. Since effective data is not included at all in the last frame (M+2), it is possible to cause no problem also in a method of encoding performed by a compression technology by an MDCT transform using adjacent frames.

As described above, after dividing a music source into frames and adding a predetermined silent portion to the music source, the record control section 14 controls the encoding section 12 so as to encode the music source by an MDCT compression technology (step S06 of FIG. 5). After step S06, the encoding is finished, and compressed musical data is produced. This compressed musical data is reproduced by a reproduction device having a decoding function described later. In this connection, the number of samples included in one frame, the number of samples to which zero is padded, and the like may be different from those described above.

Figure 8:
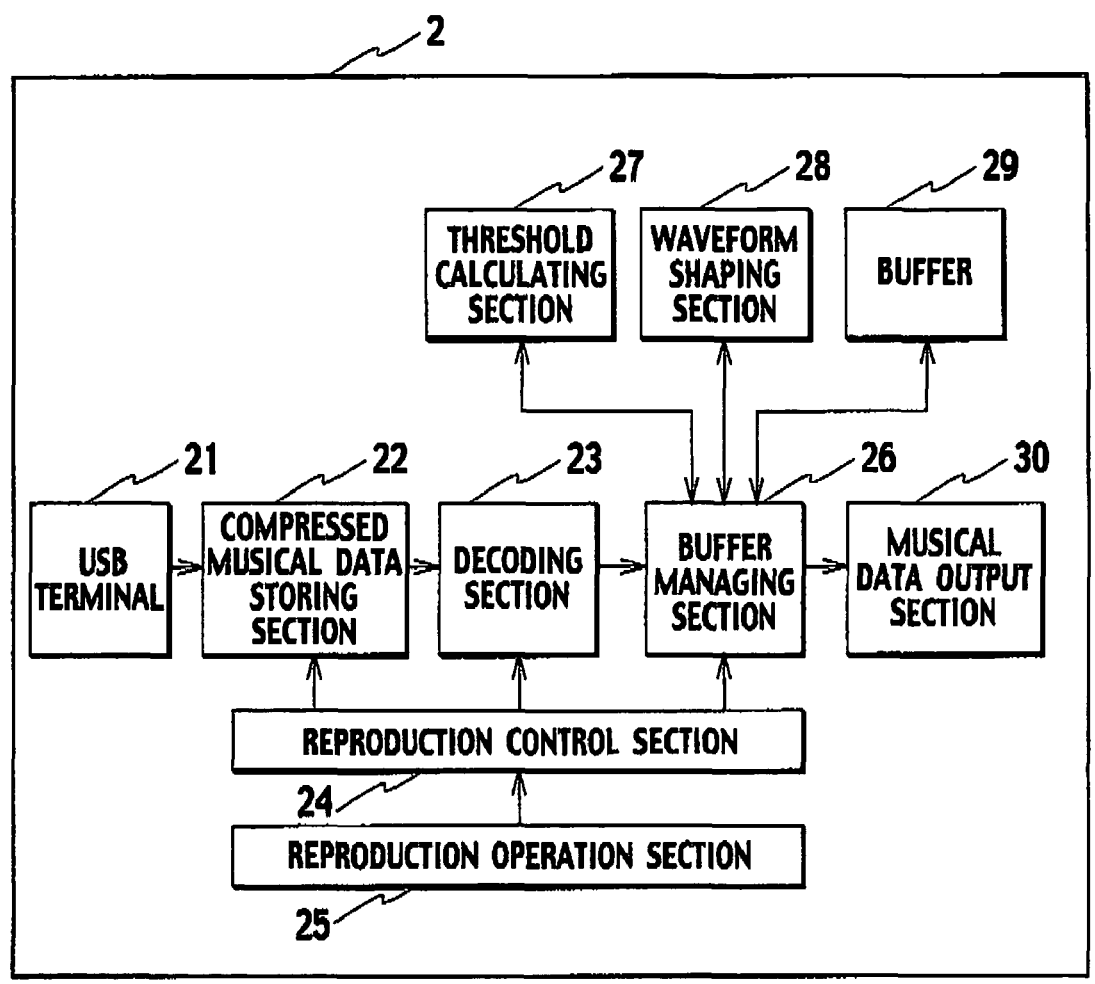
FIG. 8 is a block diagram of a reproduction device according to an embodiment of the present invention.

Next, a reproduction device according to the embodiment of the present invention will be described using FIGS. 8 to 15. FIG. 8 is a block diagram showing an example of the configuration of the reproduction device according to the embodiment of the present invention. As shown in FIG. 8, the reproduction device 2 according to this embodiment comprises a USB terminal 21, a compressed musical data storing section 22, a decoding section 23, a reproduction control section 24, a reproduction operation section 25, a buffer managing section 26, a threshold calculating section 27, a waveform shaping section 28, a buffer 29, and a musical data output section 30.

The USB terminal 21 is connected to a device storing compressed musical data encoded by the recording device 1 shown in FIG. 4 or the like, through a USB cable. The compressed musical data storing section 22 stores compressed musical data transferred through the USB terminal 21. The compressed musical data storing section 22 also supplies compressed musical data of pieces of music to be reproduced to the decoding section 23, on the basis of a reproduction instruction signal supplied from the reproduction operation section 25 through the reproduction control section 24. When music reproduction has been selected by a user's instruction, the reproduction operation section 25 supplies a reproduction instruction signal to the compressed musical data storing section 22 through the reproduction control section 24.

By the control of the reproduction control section 24, the decoding section 23 decodes compressed musical data supplied from the compressed musical data storing section 22 to produce decoded musical data (simply referred to as musical data hereinafter) and supplies the musical data to the buffer managing section 24. When the decoding section 23 has finished decoding the compressed musical data of a present piece of music to be reproduced (referred to as first compressed musical data hereinafter), it starts, before the reproduction of musical data of the present piece of music to be reproduced (referred to as first musical data) obtained by the decoding is finished, to decode the compressed musical data of the next piece of music to be reproduced (referred to as second compressed musical data hereinafter) to produce the musical data of the next piece of music to be reproduced (referred to as second musical data hereinafter).

The buffer managing section 26 stores musical data supplied from the decoding section 23 and musical data obtained after predetermined processing has been performed by the threshold calculating section 27 and the waveform shaping section 28 described later, into the buffer 29, and supplies musical data stored in the buffer 29 to the musical data output section 30, by the control of the reproduction control section 24.

The threshold calculating section 27 calculates an average amplitude level in a predetermined section starting at and before the end position of the first musical data by the control of the reproduction control section 24 and the management of the buffer managing section 26, and calculates a threshold for detecting a silent portion included in the end portion of the first musical data on the basis of the average amplitude level.

The waveform shaping section 28 shapes the waveform of the first musical data and the waveform of the second musical data so that the reproduction ending position of the first musical data described later continuously connects with the reproduction starting position of the second musical data, by the control of the reproduction control section 24 and the management of the buffer managing section 26.

The buffer 29 stores musical data supplied from the decoding section 23 and musical data after processing such as silent portion detection and waveform shaping, by the management of the buffer managing section 26. The musical data output section 30 converts musical data stored in the buffer 29 to analog signals and supplies them to an output device such as a speaker not shown in the figure, by the control of the reproduction control section 24 and the buffer managing section 26.

Next, an example of the procedure of detecting a silent portion and reproducing musical data by the reproduction device 2 according to this embodiment will be described with reference to the flow chart shown in FIGS. 9A and 9B.

Compressed musical data recorded in the recording device 1 is supplied to the compressed musical data storing section 22 through the USB terminal 21. The compressed musical data storing section 22 stores the supplied compressed musical data. The reproduction device 2 may be configured to store compressed musical data into the compressed musical data storing section 22 through a cradle, a semiconductor memory, or the like instead of the USB terminal 21. When a reproduction instruction signal is supplied from the reproduction operation section 25 to the compressed musical data storing section 22 through the reproduction control section 24 by a user's reproduction instruction, the compressed musical data storing section 22 supplies first compressed musical data stored in the compressed musical data storing section 22 to the decoding section 23 on the basis of the reproduction instruction signal (step S11 of FIG. 9A).

Figure 9A:
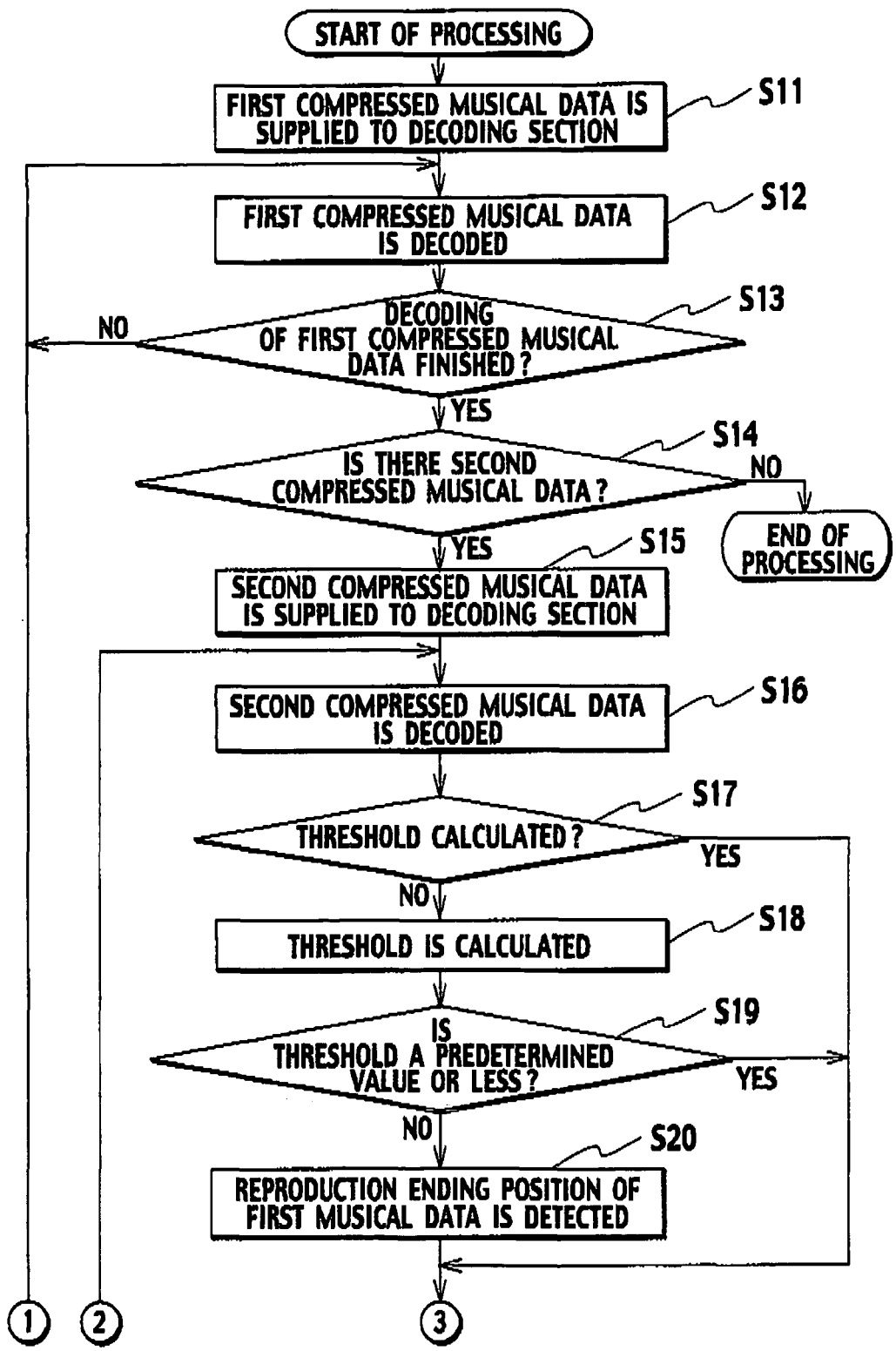
FIG. 9A is the first half of a flow chart of a procedure of reproducing musical data while removing silent portions performed by the reproduction device according to the embodiment of the present invention.

Next, the reproduction control section 24 controls the decoding section 23 so as to decode the supplied first compressed musical data (step S12 of FIG. 9A). The decoding section 23 decodes the first compressed musical data to produce first musical data. The reproduction control section 24 controls the decoding section 23 so as to supply the first musical data produced by decoding to the buffer managing section 26. The buffer 29 stores the first musical data supplied from the buffer managing section 26.

The reproduction control section 24 determines whether or not the decoding of the compressed musical data has finished (step S13 of FIG. 9A). When the decoding has not finished, the procedure returns to step S12. When the decoding has finished at step S13, the reproduction control section 24 determines whether or not there is second compressed musical data which becomes a next piece of music to be reproduced (step S14 of FIG. 9A). When there is no second compressed musical data, the reproduction of the first musical data is finished and then the reproduction processing is finished.

When there is second compressed musical data at step S14, the reproduction control section 24 controls the compressed musical data storing section 22 so as to supply second compressed musical data stored in the compressed musical data storing section 22 to the decoding section 23 (step S15 of FIG. 9A). The reproduction control section 24 controls the decoding section 23 so as to start to decode the second compressed musical data (step S16 of FIG. 9A). The decoding section 23 decodes the second compressed musical data to produce second musical data. The buffer 29 stores second musical data in succession as in the case of first musical data.

Next, the reproduction control section 24 determines whether or not the threshold calculating section 27 has calculated a threshold (step S17 of FIG. 9A). When the threshold calculating section 27 has calculated a threshold, the procedure goes to step S21. When the threshold calculating section 27 has not calculated a threshold, it calculates a threshold for detecting a silent portion of the end portion of the first musical data by the control of the reproduction control section 24 and the management of the buffer managing section 26 (step S18 of FIG. 9A).

Figure 10A:
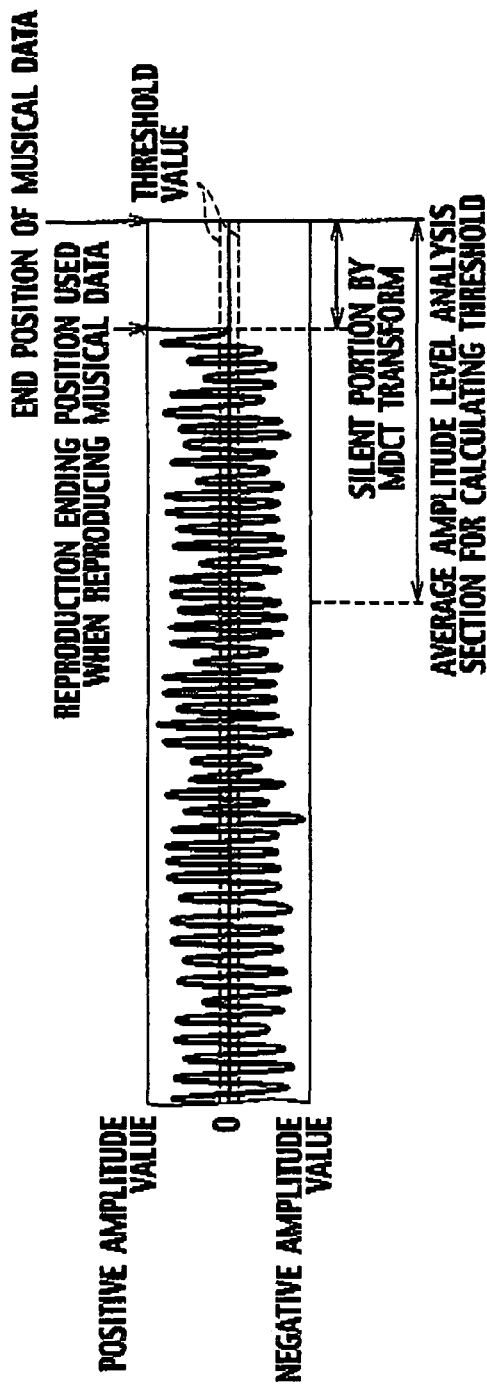
FIG. 10A is a diagram showing an example of the relation between an average amplitude level analysis section for calculating a threshold, and a silent portion, in the end portion of first musical data, in the case that the first musical data is that of a live disk, according to the embodiment of the present invention.

FIG. 10A shows an example of the relation between an average amplitude level analysis section for calculating a threshold, and a silent portion, in the end portion of first musical data, in the case that the first musical data is that of a live disk. At step S18, a threshold is calculated as follows. The reproduction control section 24 reads out first musical data stored in the buffer 29 through the buffer managing section 26. Next, the reproduction control section 24 calculates an average amplitude level in a predetermined section starting at and before the end position of the first musical data, that is, an average amplitude level analysis section shown in FIG. 10A. The average amplitude level is calculated by averaging the absolute values of amplitudes. The reproduction control section 24 controls the threshold calculating section 27 through the buffer managing section 26 so as to calculate a threshold on the basis of the average amplitude level.

A silent portion in the case of a live disk shown in FIG. 10A is added by the encoding using an MDCT transform of FIG. 5, and there is a case that the amplitudes of the silent portion has minute noise components by the influence of the MDCT transform. However, it is considered amplitude levels representing absolute values of amplitudes of the silent portion are sufficiently smaller than amplitude levels of portions having effective data. For this reason, the threshold calculating section 27 obtains, for example, the value of one-thirds of the average amplitude level calculated in the average amplitude level analysis section, and adopts it as a threshold. Furthermore, the number of samples of the silent portion is the order of the number of samples for one or two frames, so that the period of time of the silent portion is the order of several tens of milliseconds. Thus, the average amplitude level analysis section needs to be several tens of milliseconds or more.

Figure 10B:
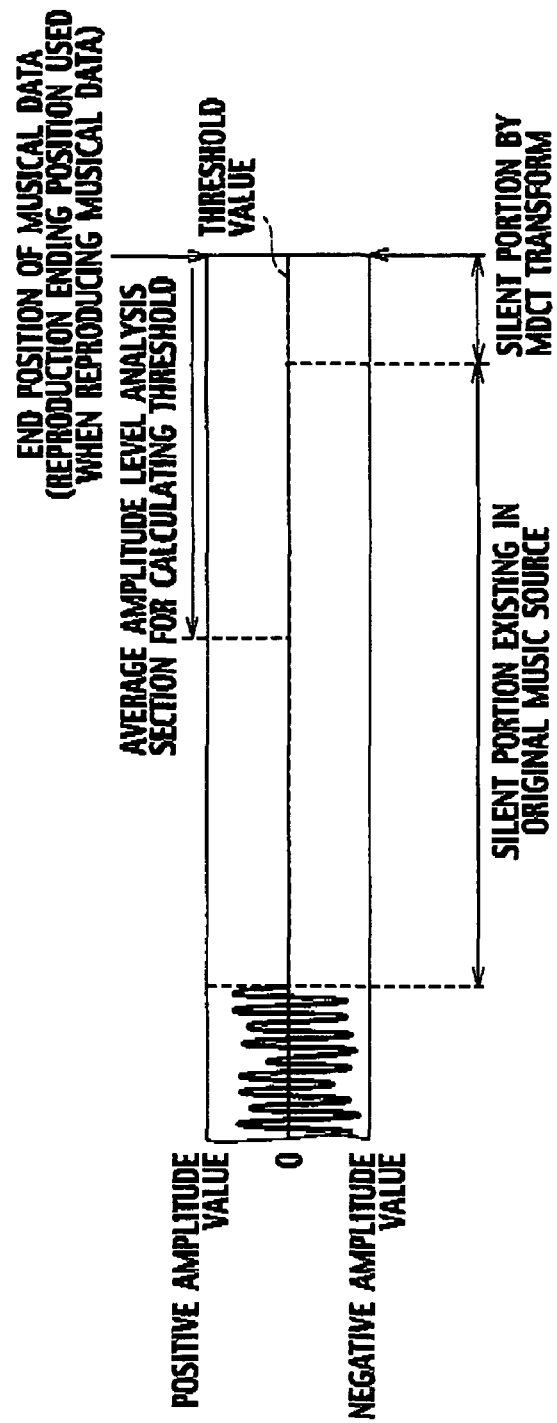
FIG. 10B is a diagram showing an example of the relation between an average amplitude level analysis section for calculating a threshold, and a silent portion, in the end portion of first musical data, in the case that the first musical data is that of a normal disk, according to the embodiment of the present invention.

FIG. 10B shows an example of the relation between an average amplitude level analysis section for calculating a threshold, and a silent portion, in the end portion of first musical data, in the case that the first musical data is that of a normal disk. A normal disk refers to a normal album CD on which musical data is recorded every piece of music. As shown in FIG. 10B, the end portion of musical data of a normal disk has a silent portion of the order of several milliseconds included in the original music source itself in addition to a silent portion added by the encoding using an MDCT transform of FIG. 5.

As described later, musical data of a live disk requires that a silent portion added by encoding using an MDCT transform is removed to suppress the occurrence of a gap, and musical data of a normal disk requires that a silent portion is removed so that reproduced sound does not become unnatural. Thus, the reproduction control section 24 determines whether or not the average amplitude level is a predetermined value or less which is assumed to be a sound level to distinguish between musical data of a live disk and musical data of a normal disk. For this reason, the average amplitude level analysis section needs to be a period of time in which a necessary and sufficient portion having effective data of the end portion is included in the case of musical data of a live disk, or a period of time in which only a silent portion is included in the case of musical data of a normal disk, and is preferable to be the order of several hundreds of milliseconds. Thus, a threshold obtained from musical data of a live disk has a predetermined value as shown in FIG. 10A, while a threshold obtained from musical data of a normal disk becomes approximately zero as shown in FIG. 10B. A threshold is an absolute value, thus being represented by a positive amplitude value and a negative amplitude value.

Next, the reproduction control section 24 determines whether or not a threshold calculated by the threshold calculating section 27 is a predetermined value or less (step S19 of FIG. 9A). When the threshold is not a predetermined value or less, in other words, when it is considered that the first musical data is musical data of a live disk, the reproduction control section 24 detects, within a range of the leading position of the first musical data to the end position of the first musical data, a position at the amplitude level which is the threshold or more and is nearest to the end position, as a reproduction ending position used when reproducing the first musical data (step S20 of FIG. 9A). Since both of an amplitude level and a threshold are absolute values, an amplitude level which is the threshold or more is represented by both of a positive amplitude value which is the positive value of the threshold or more and a negative amplitude value which is the negative value of the threshold or less. Furthermore, a silent portion means a portion in which amplitude levels are the threshold or less. Thus, as shown in FIG. 10A, the silent portion of the end portion of the first musical data is detected and removed to obtain the reproduction ending position. The reproduction control section 24 then stores information indicating the detected reproduction ending position of the first musical data and information such as the amplitude level at the reproduction ending position into the buffer 29 through the buffer managing section 26.

On the other hand, when the threshold is a predetermined value or less at step S19, in other words, when it is considered that the first musical data is musical data of a normal disk, if the silent portion of the end portion of the first musical data shown in FIG. 10B is detected and removed, unnatural reproduced sound is obtained. Thus, the reproduction control section 24 regards the reproduction ending position of the first musical data as the end position of the first musical data, and goes to step S21 described later.

Figure 9B:
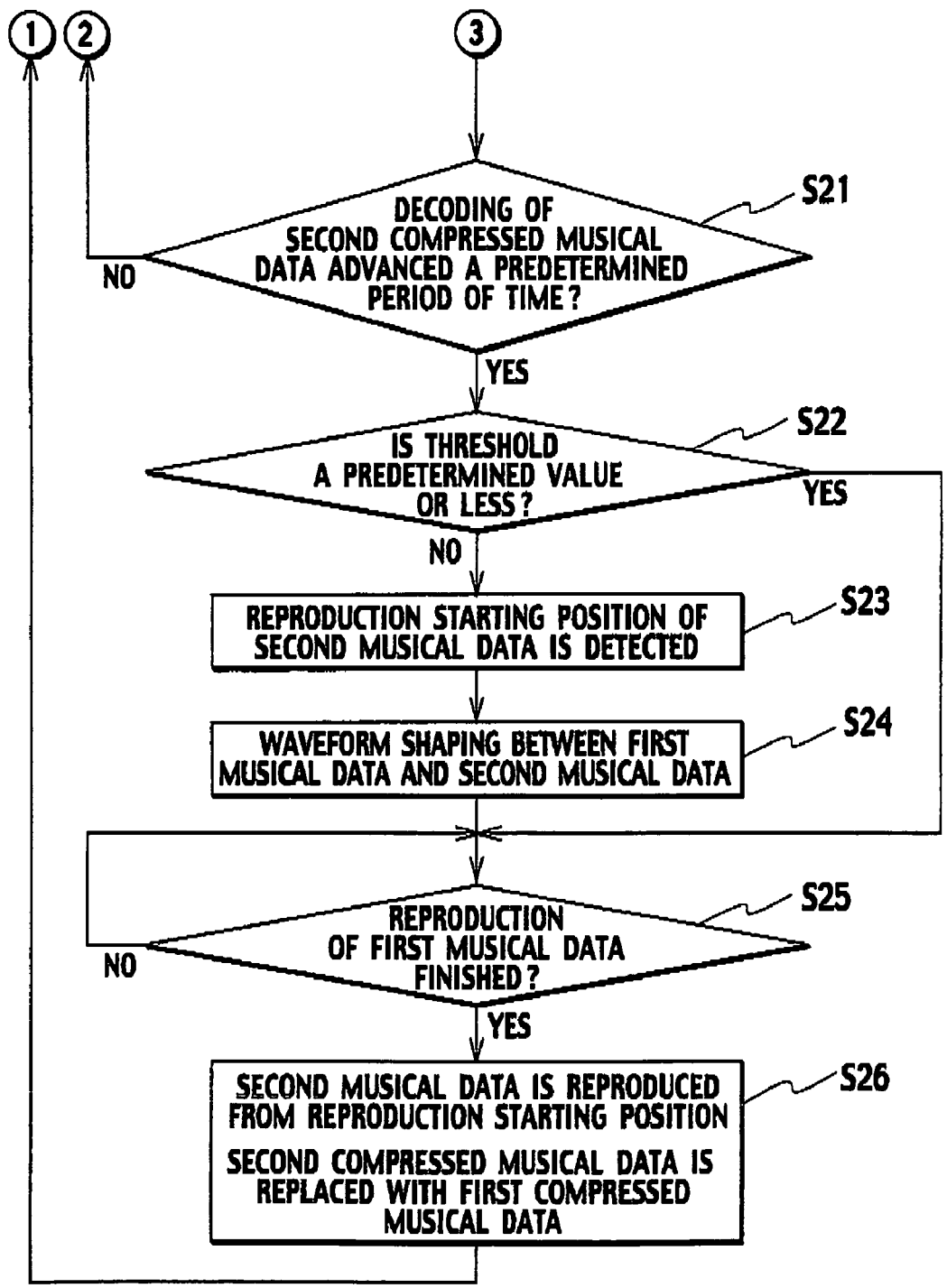
FIG. 9B is the second half of the flow chart of the procedure of reproducing musical data while removing silent portions performed by the reproduction device according to the embodiment of the present invention.

Next, the reproduction control section 24 determines whether or not decoding of the second musical data has advanced a predetermined period of time (step S21 of FIG. 9B). When the decoding has not advanced a predetermined period of time, the procedure returns to step S16. When the decoding has advanced a predetermined period of time, the reproduction control section 24 determines whether or not the threshold is a predetermined value or less (step S22 of FIG. 9B). When the threshold is not a predetermined value or less, in other words, when it is considered that the second musical data is musical data of a live disk, the reproduction control section 24 detects a reproduction starting position used when reproducing the second musical data (step S23 of FIG. 9B). The reproduction starting position of the second musical data is detected as a position where the second musical data can be reproduced in direct connection with the reproduction ending position of the first musical data as described later.

When the threshold is a predetermined value or less at step S23, in other words, when it is considered that the second musical data is musical data of a normal disk, it is not necessary to detect the silent portion of the leading portion of the second musical data as described above, so that the reproduction control section 24 regards the reproduction starting position of the second musical data as the leading position of the second musical data and goes to step S25. The silent portion of the leading portion of musical data of a normal disk is also constituted, as in the case of the silent portion of the end portion, by a silent portion added by decoding using an MDCT transform and a silent portion included in the original music source itself.

Step S23 is performed after the decoding at step S21 has advanced a predetermined period of time. The reason is that since a silent portion is added to the leading portion of the second musical data, if the decoding has not advanced a predetermined period of time, the reproduction starting position used when reproducing the second musical data can not be detected.

At step S23, the reproduction control section 24 reads out the decoded portion of the second musical data stored in the buffer 29 through the buffer managing section 26, and then detects the silent portion of the leading portion of the second musical data using the threshold calculated at step S18. The waveform of the end portion of the first musical data is originally connected with the waveform of the leading portion of the second musical data, so that it is considered that there is no large difference in amplitude level between the end portion of the first musical data and the leading portion of the second musical data. For this reason, also at step S23, the same threshold as the value calculated in the end portion is used.

The reproduction control section 24 detects a position of the second musical data satisfying the following conditions as a reproduction starting position in the leading portion of the second musical data. The first condition is that the amplitude level is the threshold or more. According to the first condition, the silent portion of the leading portion of the second musical data added by encoding using an MDCT transform is detected and removed. The second condition is that the amplitude fluctuation direction is identical to the amplitude fluctuation direction at the reproduction ending position of the first musical data. The third condition is that the amplitude level is within a range of a predetermined level from the amplitude level at the reproduction ending position of the first musical data. The second and third conditions are desired to be satisfied, but need not to be satisfied as necessary.

A position in the data which satisfies the aforementioned conditions and is nearest to the leading position of the leading portion of the second musical data is detected as a reproduction starting position used when reproducing the second musical data. For detection of the reproduction starting position of the second musical data, information about the amplitude level and the amplitude fluctuation direction at the reproduction ending position of the first musical data stored in the buffer 29 is used as described above.

Figure 11A:
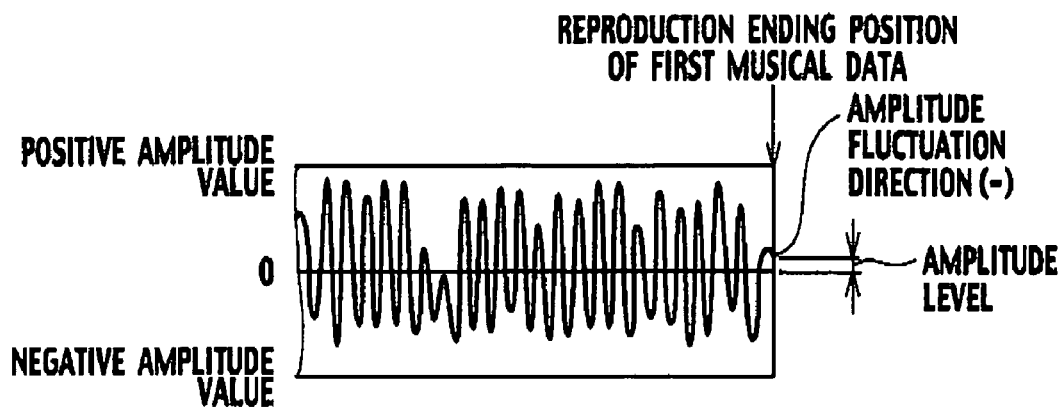
FIG. 11A is a diagram showing an example of amplitude information at the reproduction ending position of first musical data according to the embodiment of the present invention.
Figure 11B:
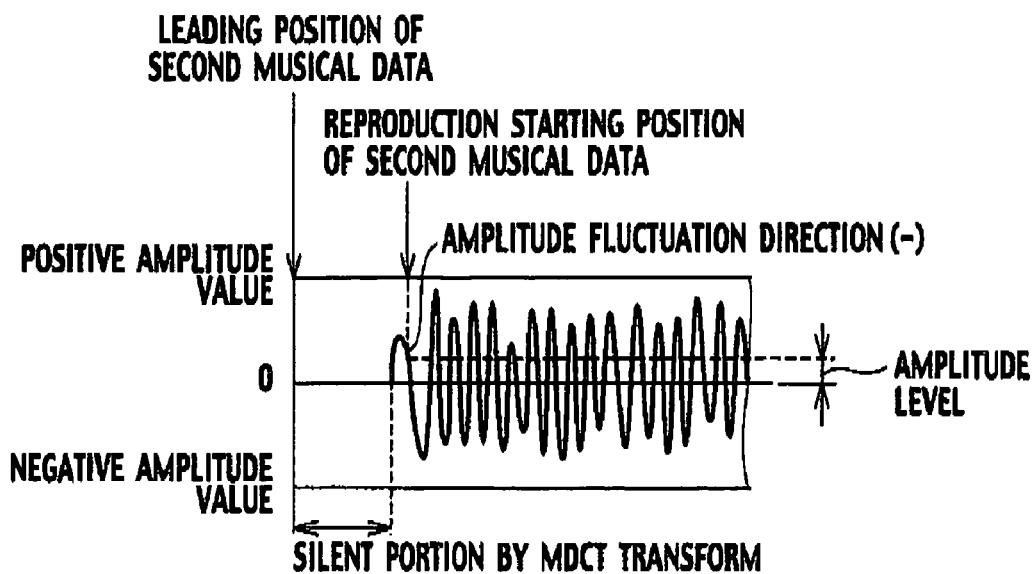
FIG. 11B is a diagram showing an example of amplitude information at the reproduction starting position of second musical data according to the embodiment of the present invention.

FIG. 11A shows an example of the amplitude information at the reproduction ending position of the first musical data. FIG. 11B shows an example of the amplitude information at the reproduction starting position of the second musical data. FIG. 11B shows a case that a position in the second musical data which satisfies the first to third conditions and is nearest to the leading position of the second musical data is used as a reproduction starting position used when reproducing the second musical data.

As shown in FIGS. 11A and 11B, the amplitude fluctuation direction in which the amplitude value changes from a negative to a positive is referred to as (+), and the amplitude fluctuation direction in which the amplitude value changes from a positive to a negative is referred to as (−). In FIGS. 11A and 11b, the amplitude fluctuation direction at the reproduction ending position of the first musical data is (−). Thus, the reproduction control section 24 detects a position of the second musical data, where the fluctuation direction of the amplitude is (−) and the amplitude level is in a predetermined range, nearest to the leading position of the second musical data, excluding positions in the silent portion where the amplitude levels are the threshold or less.

Since it is difficult to detect a position where the amplitude level of the first musical data agrees with the amplitude level of the second musical data, if the amplitude level of the second musical data is, for example, in the range from ½ to 2 times the amplitude level at the reproduction ending position of the first musical data, defined in advance, the reproduction control section 24 considers that both of the amplitude levels are the same. The reproduction control section 24 stores information, which indicates the detected reproduction starting position of the second musical data, into the buffer 29 through the buffer managing section 26. The amplitude levels may be assumed to be the same by another method.

A position nearest to the leading position of the second musical data, which satisfies the following fourth condition in addition to the first to third conditions described above, may be adopted as a reproduction starting position used when reproducing the second musical data. The fourth condition is that the waveform inclinations in the leading portion of the second musical data are within a range of a predetermined waveform inclination from the waveform inclination at the reproduction ending position of the first musical data.

Figure 12A:
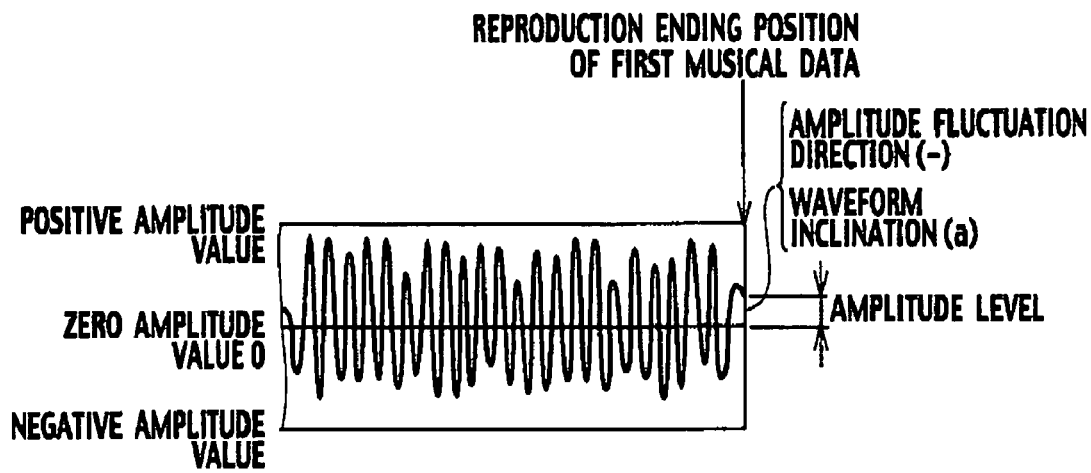
FIG. 12A is a diagram showing an example of amplitude information at the reproduction ending position of first musical data according to the embodiment of the present invention.
Figure 12B:
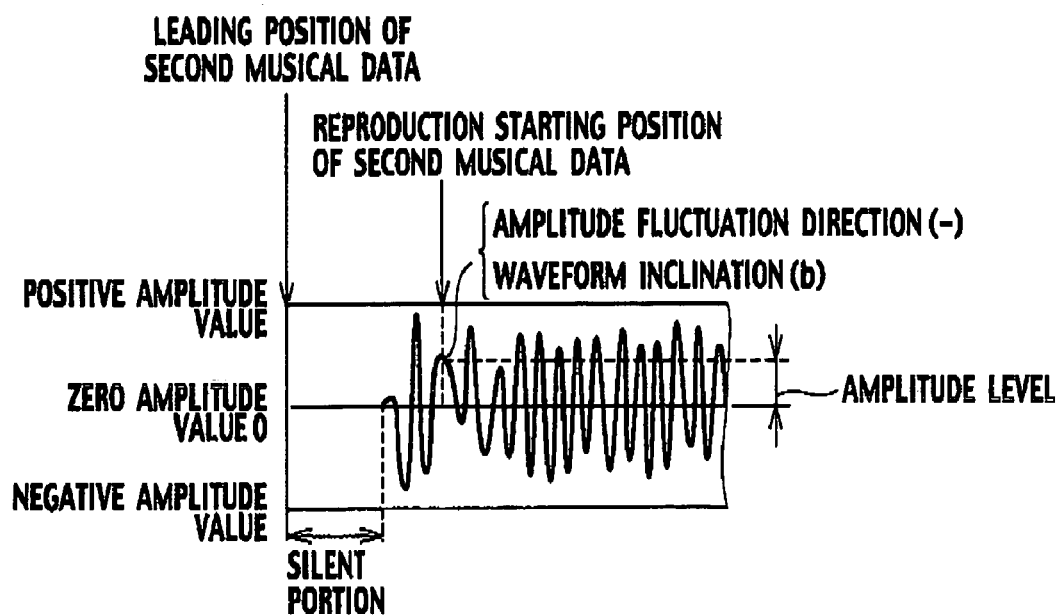
FIG. 12B is a diagram showing an example of amplitude information at the reproduction starting position of second musical data according to the embodiment of the present invention.

FIG. 12A shows another example of the waveform of the end portion of the first musical data. FIG. 12B shows another example of the waveform of the leading portion of the second musical data. In FIGS. 12A and 12B, the amplitude fluctuation direction at the reproduction ending position of the first musical data is (−), and the value of the waveform inclination at the reproduction ending position of the first musical data is (a). Thus, the reproduction control section 24 detects a position nearest to the leading position of the second musical data, where the amplitude fluctuation direction is (−), the amplitude level is in a predetermined range, and the value (b) of the amplitude fluctuation inclination is in a predetermined range, excluding positions in the silent portion where the amplitude level is the threshold or less, in the second musical data.

Consideration about the waveform inclination is similar to the consideration about the amplitude level. In other words, if the waveform inclination value (b) at a given position of the second musical data is within a range of a predetermined value from the value (a) of the waveform inclination at the reproduction ending position of the first musical data, the reproduction control section 24 considers that both of the values of inclination are the same. The waveform inclination at a given position may be the fluctuation inclination between the given position and the preceding position or may be the fluctuation inclination among a predetermined number of samples.

As described above, there is a high possibility that the amplitude level at the reproduction starting position of the second musical data detected at step S23 does not completely agree with the amplitude level at the reproduction ending position of the first musical data. Furthermore, actually, there is a possibility that a portion having effective data in musical data is judged to be a silent portion by mistake. For this reason, after the processing at step S23, the reproduction control section 24 controls the waveform shaping section 28 through the buffer managing section 26 so as to perform wave shaping between the first musical data and the second musical data so that the reproduction ending position of the first musical data is continuously connected to the reproduction starting position of the second musical data (step S24 of FIG. 9B).

Figure 13A:
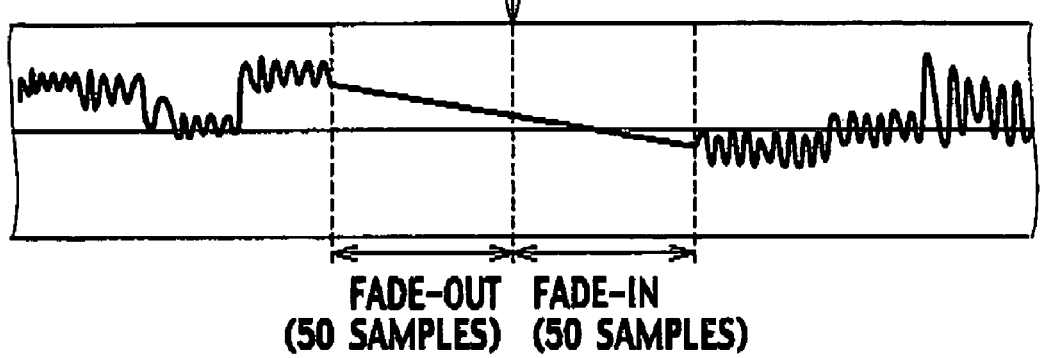
FIG. 13A is a diagram showing an example of waveforms after waveform shaping of first and second musical data according to the embodiment of the present invention.
Figure 13B:
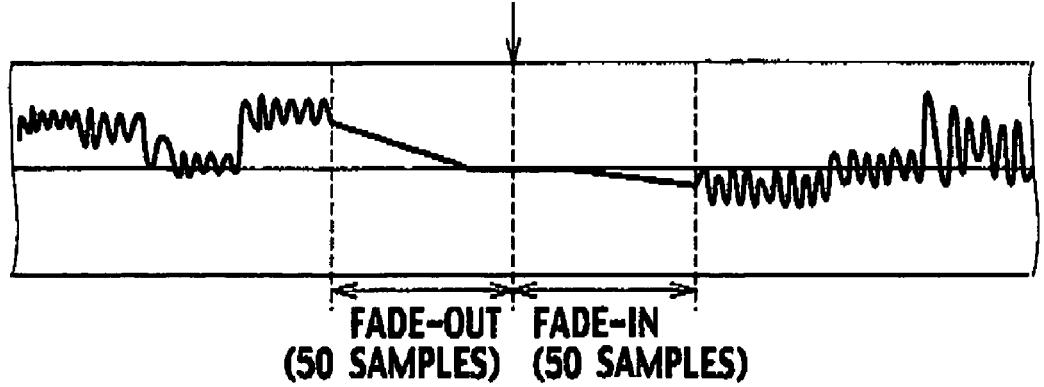
FIG. 13B is a diagram showing another example of waveforms after waveform shaping of first and second musical data according to the embodiment of the present invention.

FIG. 13A shows an example of a waveform after waveform shaping of the first musical data and the second musical data. FIG. 13B shows another example of a waveform after waveform shaping of the first musical data and the second musical data. At step S24, the reproduction control section 24 receives information such as the amplitude level at the reproduction ending position of the first musical data and the amplitude level at the reproduction starting position of the second musical data from the buffer managing section 26.

As shown in FIG. 13A, assuming that the reproduction ending position of the first musical data and the reproduction starting position of the second musical data are a connecting position, the end portion of the first musical data is faded out and the leading portion of the second musical data is faded in. In terms of a natural sense of hearing, it is desirable that the fade-out and the fade-in are performed in the range of several milliseconds. In FIG. 13A, each of the fade-out and the fade-in is performed on 50 samples.

Furthermore, as shown in FIG. 13B, it is desirable that the amplitude level at a connecting position between the fade-out and the fade-in is a level (zero) representing silence. This is to suppress the occurrence of an unnatural reproduced sound at the connecting position. The reproduction control section 24 stores fade-out waveform data and the fade-in waveform data after the waveform shaping at step S24 into the buffer 29 through the buffer managing section 26, and then uses the data obtained by waveform shaping performed at step S24 when reproducing the end portion of the first musical data and the leading portion of the second musical data.

After the processing at step S24, the reproduction control section 24 determines whether or not reproduction has finished to the reproduction ending position of the first musical data (step S25 of FIG. 9B). When reproduction has not finished to the reproduction ending position of the first musical data, the procedure returns to step S24 again. When reproduction has finished to reproduction ending position of the first musical data, the reproduction control section 24 sequentially reads out second musical data stored in the buffer 29 and supplies it to the musical data output section 30 through the buffer managing section 26. The musical data output section 30 supplies the second musical data to an output device such as a speaker and reproduces it (step S26 of FIG. 9B). After that, the reproduction control section 24 returns to step S12, replaces the second musical data with the first musical data to reproduce it, decodes portions which have not been decoded of the compressed musical data, and then repeats the same processing.

Figure 14:
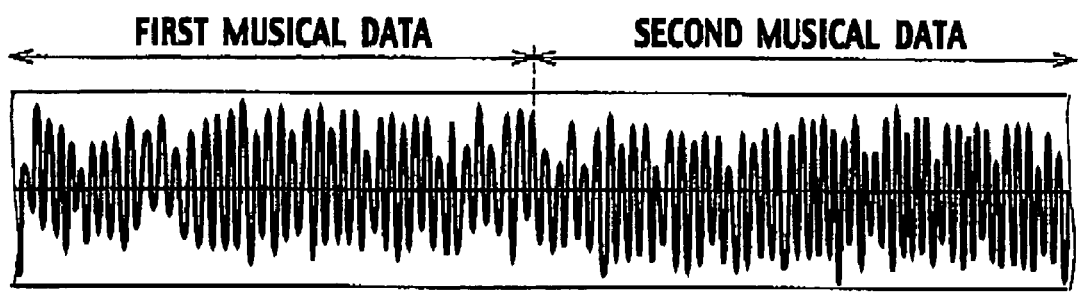
FIG. 14 is a diagram showing an example of a waveform obtained by removing the silent portion between first and second musical data obtained from a live disk according to the flow chart shown in FIGS. 9A and 9B in the reproduction device according to the embodiment of the present invention.
Figure 15:
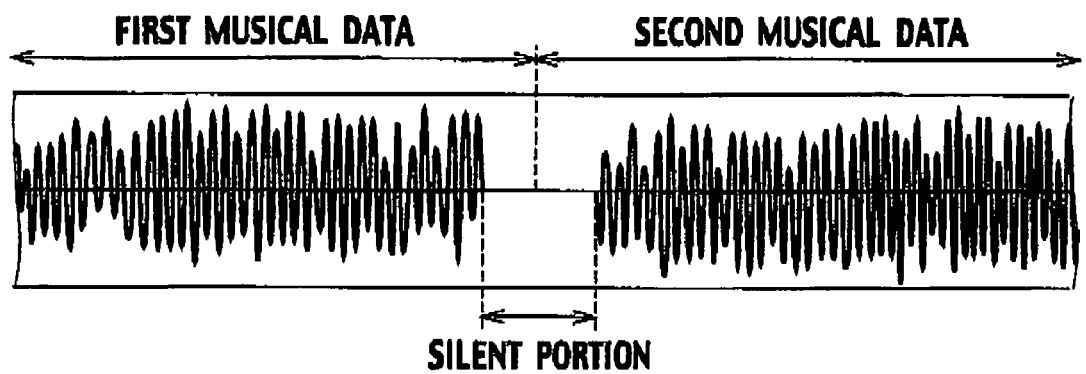
FIG. 15 is a diagram showing a waveform in which first and second musical data of a live disk are connected directly in the reproduction device according to the embodiment of the present invention.

FIG. 14 shows a waveform obtained by removing the silent portion between the first and second musical data of a live disk according to the flow chart shown in FIGS. 9A and 9B. FIG. 15 shows a waveform obtained by directly connecting the first musical data and the second musical data. It is understood, in comparison with the waveform of FIG. 15, that the silent portion between pieces of music has been removed in the waveform of FIG. 14. The reproduction device 2 is able to suppress the occurrence of a gap by detecting and removing a silent portion when reproducing musical data of a live disk so that the reproduced sound does not become unnatural.

Figure 16:
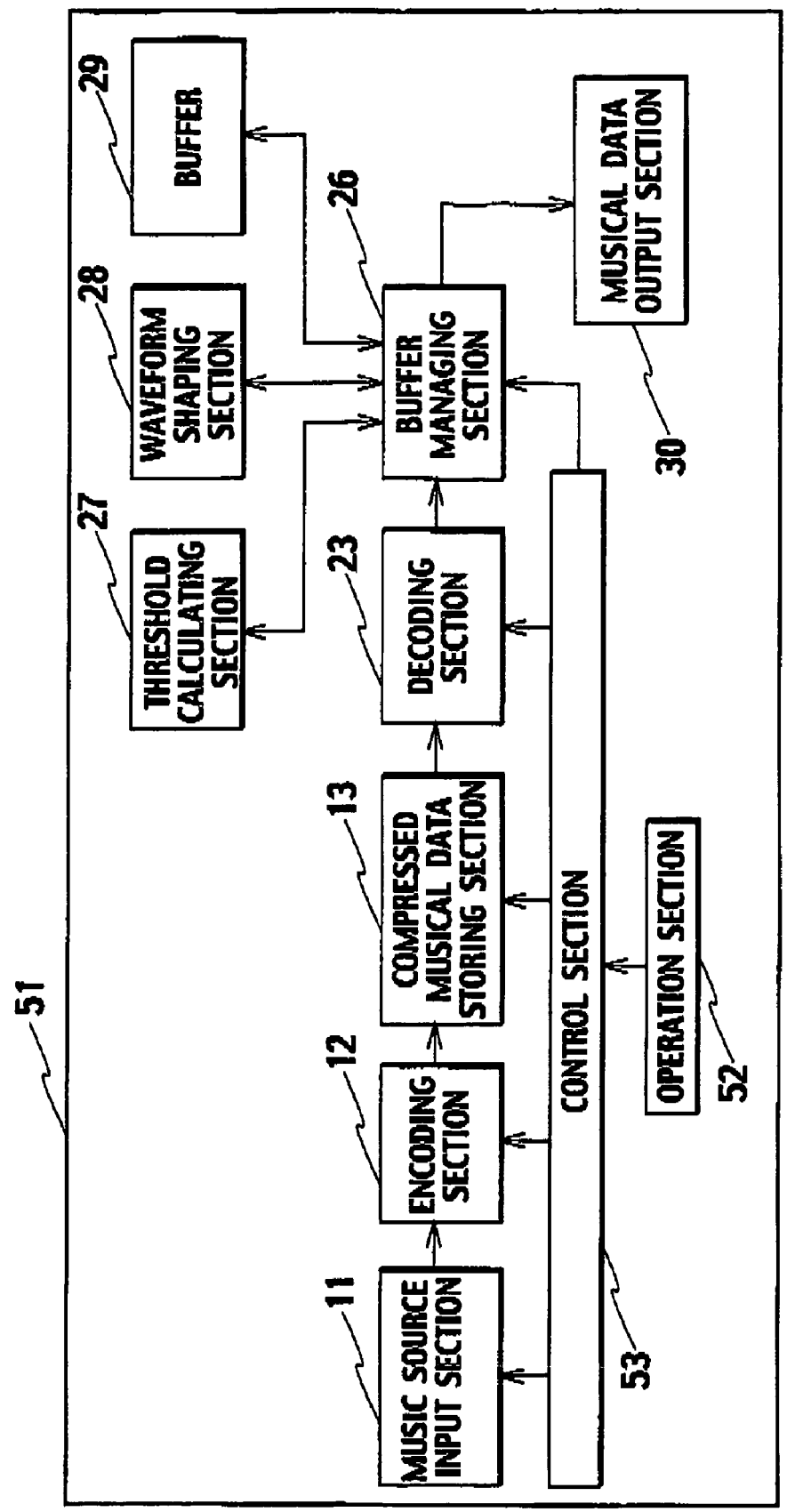
FIG. 16 is a block diagram of a recording and reproduction device according to the embodiment of the present invention.

FIG. 16 is a block diagram showing an example of the configuration of a recording and reproduction device according to the embodiment of the present invention. As shown in FIG. 16, the recording and reproduction device 51 is a recording device 1 shown in FIG. 4 and reproduction device 2 shown in FIG. 8 integrated into one unit. Components in FIG. 16 to which the same notations as those of FIGS. 4 and 8 are attached are equivalent to components depicted in FIGS. 4 and 8, thereby being not described here. The operation section 52 has both of the function of the record operation section 15 shown in FIG. 4 and the function of the reproduction operation section 25 shown in FIG. 8. The control section 53 has both of the function of the record control section 14 shown in FIG. 4 and the function of the reproduction control section 24 shown in FIG. 8. Even if the recording device 1 and the reproduction device 2 are integrated like the recording and reproduction device 51 shown in FIG. 16, the recording and reproduction device 51 is able to reproduce musical data while suppressing the occurrence of a gap causing sound interruption between pieces of music according to the flow chart shown in FIGS. 9A and 9B as described above.

As described above, the silent portion of the end portion of first musical data and the silent portion of the leading portion of second musical data are detected using the average amplitude level in a predetermined section before the end position of the first musical data. In the case of a music source of a live disk in which pieces of music are connected with each other, the musical data can be reproduced while suppressing sound interruption between pieces of music by removing the silent portions. Furthermore, in the case of a music source of a normal disk in which musical data is configured every piece of music, the musical data can be reproduced with a normal natural sound without removing the silent portions. Furthermore, the reproduction device of the present invention is able to discriminate between a live disk and a normal disk without manual switching, thus putting a light load on a user.

When the reproduction device of the present invention is connected to a recording device such as a digital audio disk player, a personal computer, or an external server by a cable or radio, the reproduction device is applicable to a portable digital audio disk player, a mobile telephone, a personal computer, or the like configured so as to be able to receive musical data.

What is claimed is:

1. A reproduction device comprising:
  a decoding unit configured to sequentially decode compressed musical data to be reproduced;
  a threshold calculating unit configured to calculate an average amplitude level in a predetermined section of an end portion of first musical data generated by decoding first compressed musical data by the decoding unit, and calculate a threshold for detecting a silent portion in the end portion of the first musical data on the basis of the calculated average amplitude level;
  a reproduction ending position detector detecting a position of the first musical data as a reproduction ending position used at a time of reproduction of the first musical data, wherein the position is nearest to an end position of the first musical data at an amplitude level which is the threshold calculated by the threshold calculating unit or more;
  a reproduction starting position detector detecting a position of second musical data, which is generated by decoding second compressed musical data to be reproduced next to the first compressed musical data by the decoding unit, as a reproduction starting position used at a time of reproduction of the second musical data, wherein the position is near a leading position of the second musical data at an amplitude level which is the threshold or more; and
  a reproducing unit configured to reproduce the first musical data until the reproduction ending position and then reproduce the second musical data from the reproduction starting position.

2. The reproduction device according to claim 1, wherein
the reproduction starting position detector detects a position in a data portion of the second musical data as the reproduction starting position of the second musical data,
the data portion has the same amplitude fluctuation direction as an amplitude fluctuation direction at the reproduction ending position of the first musical data, and
the position is nearest to the leading position of the second musical data at an amplitude level which is within a range of a predetermined level from the amplitude level at the reproduction ending position of the first musical data.

3. The reproduction device according to claim 2, wherein
the reproduction starting position detector detects a position of the second musical data as the reproduction starting position of the second musical data, and
the position is nearest to the leading position of the second musical data and has a waveform inclination which is within a range of a predetermined inclination from a waveform inclination at the reproduction ending position of the first musical data.

4. The reproduction device according to claim 1, further comprising a determining unit configured to determine whether or not the threshold is a predetermined value or less, wherein
the reproduction ending position detector detects the end position of the first musical data as the reproduction ending position used at a time of reproduction of the first musical data when the determining unit determines that the threshold is the predetermined value or less, and
the reproduction starting position detector detects the leading position of the second musical data as the reproduction starting position used at a time of reproduction of the second musical data when the determining unit determines that the threshold is the predetermined value or less.

5. The reproduction device according to claim 1, further comprising a waveform shaping unit configured to shape a waveform in a predetermined section before the reproduction ending position of the first musical data and a waveform in a predetermined section after the reproduction starting position of the second musical data so as to connect the reproduction ending position of the first musical data to the reproduction starting position of the second musical data continuously.

6. The reproduction device according to claim 5, wherein the waveform shaping unit shapes waveforms so that an amplitude level at a position where the first musical data is connected to the second musical data is a level representing silence.

7. A reproduction method comprising the steps of:
sequentially decoding compressed musical data to be reproduced;
calculating an average amplitude level in a predetermined section of an end portion of first musical data generated by decoding first compressed musical data by the decoding step, and calculating a threshold for detecting a silent portion in the end portion of the first musical data on the basis of the calculated average amplitude level;
detecting a position of the first musical data as a reproduction ending position used at a time of reproduction of the first musical data, wherein the position is nearest to an end position of the first musical data at an amplitude level which is the threshold calculated by the threshold calculating step or more;
detecting a position of second musical data, which is generated by decoding second compressed musical data to be reproduced next to the first compressed musical data by the decoding step, as a reproduction starting position used at the time of reproduction of the second musical data, wherein the position is near a leading position of the second musical data at an amplitude level which is the threshold or more; and
reproducing the first musical data until the reproduction ending position and then reproducing the second musical data from the reproduction starting position.

8. The reproduction method according to claim 7, wherein
the starting position detecting step detects a position in a data portion of the second musical data as the reproduction starting position of the second musical data,
the data portion has the same amplitude fluctuation direction as an amplitude fluctuation direction at the reproduction ending position of the first musical data, and
the position is nearest to the leading position of the second musical data at an amplitude level which is within a range of a predetermined level from the amplitude level at the reproduction ending position of the first musical data.

9. The reproduction method according to claim 8, wherein
the starting position detecting step detects a position of the second musical data as the reproduction starting position of the second musical data, and
the position is nearest to the leading position of the second musical data and has a waveform inclination which is within a range of a predetermined inclination from a waveform inclination at the reproduction ending position of the first musical data.

10. The reproduction method according to claim 7, further comprising a step of determining whether or not the threshold is a predetermined value or less, wherein
the ending position detecting step detects the end position of the first musical data as the reproduction ending position used at a time of reproduction of the first musical data when the determining step determines that the threshold is the predetermined value or less, and
the starting position detecting step detects the leading position of the second musical data as the reproduction starting position used at a time of reproduction of the second musical data when the determining unit determines that the threshold is the predetermined value or less.

11. The reproduction method according to claim 7, further comprising a step of shaping a waveform in a predetermined section before the reproduction ending position of the first musical data and a waveform in a predetermined section after the reproduction starting position of the second musical data so as to connect the reproduction ending position of the first musical data to the reproduction starting position of the second musical data continuously.

12. The reproduction method according to claim 11, wherein the waveform shaping step shapes waveforms so that an amplitude level at a position where the first musical data is connected to the second musical data is a level representing silence.

13. A computer usable medium having a computer readable reproduction program embodied therein, the computer readable reproduction program comprising:
a first reproduction program code causing the computer to sequentially decode compressed musical data to be reproduced;
a second reproduction program code causing the computer to calculate an average amplitude level in a predetermined section of an end portion of first musical data generated by decoding first compressed musical data by the first reproduction program code, and calculate a threshold for detecting a silent portion in the end portion of the first musical data on the basis of the calculated average amplitude level;

a third reproduction program code causing the computer to detect a position of the first musical data as a reproduction ending position used at a time of reproduction of the first musical data, wherein the position is nearest to an end position of the first musical data at an amplitude level which is the threshold calculated by the second reproduction program code or more;

a fourth reproduction program code causing the computer to detect a position of second musical data, which is generated by decoding second compressed musical data to be reproduced next to the first compressed musical data by the first reproduction program code, as a reproduction starting position used at a time of reproduction of the second musical data, wherein the position is near a leading position of the second musical data at an amplitude level which is the threshold or more; and a fifth reproduction program code causing the computer to reproduce the first musical data until the reproduction ending position and then reproduce the second musical data from the reproduction starting position.

14. The medium according to claim 13, wherein the fourth reproduction program code causes the computer to detect a position in a data portion of the second musical data as the reproduction starting position of the second musical data, the data portion has the same amplitude fluctuation direction as an amplitude fluctuation direction at the reproduction ending position of the first musical data, and the position is nearest to the leading position of the second musical data at an amplitude level which is within a range of a predetermined level from the amplitude level at the reproduction ending position of the first musical data.

15. The medium according to claim 14, wherein the fourth reproduction program code causes the computer to detect a position of the second musical data as the reproduction starting position of the second musical data, and the position is nearest to the leading position of the second musical data and has a waveform inclination which is within a range of a predetermined inclination from a waveform inclination at the reproduction ending position of the first musical data.

16. The medium according to claim 13, further comprising a sixth reproduction program code causing the computer to determine whether or not the threshold is a predetermined value or less, wherein the third reproduction program code causes the computer to detect the end position of the first musical data as the reproduction ending position used at a time of reproduction of the first musical data when the sixth reproduction program code causes the computer to determine that the threshold is the predetermined value or less, and the fourth reproduction program code causes the computer to detect the leading position of the second musical data as the reproduction starting position used at a time of reproduction of the second musical data when the sixth reproduction program code causes the computer to determine that the threshold is the predetermined value or less.

17. The medium according to claim 13, further comprising a seventh reproduction program code causing the computer to shape a waveform in a predetermined section before the reproduction ending position of the first musical data and a waveform in a predetermined section after the reproduction starting position of the second musical data so as to connect the reproduction ending position of the first musical data to the reproduction starting position of the second musical data continuously.

18. The medium according to claim 13, wherein the seventh reproduction program code causes the computer to shape waveforms so that an amplitude level at a position where the first musical data is connected to the second musical data is a level representing silence.

* * * * *

UNITED STATES PATENT AND TRADEMARK OFFICE
CERTIFICATE OF CORRECTION

PATENT NO. : 7,714,223 B2
APPLICATION NO. : 12/010685
DATED : May 11, 2010
INVENTOR(S) : Taiyo Matsuhashi et al.

It is certified that error appears in the above-identified patent and that said Letters Patent is hereby corrected as shown below:

Title Page
Item (54) Title of the Invention

Please delete "REPRODUCTION DEVICE, REPRODUCTION METHOD AND COMPUTER USABLE MEDIUM HAVING COMPUTER READABLE REPRODUCTION PROGRAM EMODIED THEREIN"

and replace with -- REPRODUCTION DEVICE, REPRODUCTION METHOD AND COMPUTER USABLE MEDIUM HAVING COMPUTER READABLE REPRODUCTION PROGRAM EMBODIED THEREIN --

Signed and Sealed this

Twenty-second Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,714,223 B2 Page 1 of 1
APPLICATION NO. : 12/010685
DATED : May 11, 2010
INVENTOR(S) : Taiyo Matsuhashi et al.

It is certified that error appears in the above-identified patent and that said Letters Patent is hereby corrected as shown below:

Title Page, Item (54) and at Column 1, lines 1-5,
Title of the Invention

Please delete "REPRODUCTION DEVICE, REPRODUCTION METHOD AND COMPUTER USABLE MEDIUM HAVING COMPUTER READABLE REPRODUCTION PROGRAM EMODIED THEREIN"

and replace with -- REPRODUCTION DEVICE, REPRODUCTION METHOD AND COMPUTER USABLE MEDIUM HAVING COMPUTER READABLE REPRODUCTION PROGRAM EMBODIED THEREIN --

This certificate supersedes the Certificate of Correction issued June 22, 2010.

Signed and Sealed this

Twentieth Day of July, 2010

David J. Kappos
*Director of the United States Patent and Trademark Office*